United States Patent
Hendrickson et al.

(10) Patent No.: US 8,460,108 B2
(45) Date of Patent: Jun. 11, 2013

(54) COMPUTERIZED METHOD AND SYSTEM FOR GENERATING A GAMING EXPERIENCE IN A NETWORKED ENVIRONMENT

(75) Inventors: Gregory L. Hendrickson, Seattle, WA (US); Jonathan C. Cluts, Sammamish, WA (US); Pamela J. Heath, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 821 days.

(21) Appl. No.: 11/065,833

(22) Filed: Feb. 25, 2005

(65) Prior Publication Data

US 2006/0194632 A1    Aug. 31, 2006

(51) Int. Cl.
*A63F 9/24* (2006.01)

(52) U.S. Cl.
USPC ........ 463/42; 463/7; 463/16; 463/29; 463/30; 463/39; 463/40; 463/41; 370/254; 370/463; 370/465

(58) Field of Classification Search
USPC ................ 463/7, 16, 29–31, 39–42; 370/254, 370/463, 465
See application file for complete search history.

(56) References Cited

U.S. PATENT DOCUMENTS

| | | | | |
|---|---|---|---|---|
| RE33,559 E | * | 3/1991 | Fallacaro et al. | 386/97 |
| 5,299,810 A | * | 4/1994 | Pierce et al. | 463/2 |
| 5,720,619 A | * | 2/1998 | Fisslinger | 434/336 |
| 5,927,988 A | * | 7/1999 | Jenkins et al. | 434/116 |
| 6,144,375 A | * | 11/2000 | Jain et al. | 715/251 |
| 6,965,205 B2 | * | 11/2005 | Piepgras et al. | 315/318 |
| 7,064,498 B2 | * | 6/2006 | Dowling et al. | 315/291 |
| 7,136,709 B2 | * | 11/2006 | Arling et al. | 700/65 |
| 7,155,305 B2 | * | 12/2006 | Hayes et al. | 700/224 |
| 7,379,778 B2 | * | 5/2008 | Hayes et al. | 700/66 |
| 2002/0048169 A1 | * | 4/2002 | Dowling et al. | 362/234 |
| 2002/0070688 A1 | * | 6/2002 | Dowling et al. | 315/312 |
| 2003/0057884 A1 | * | 3/2003 | Dowling et al. | 315/291 |
| 2003/0137258 A1 | * | 7/2003 | Piepgras et al. | 315/291 |
| 2003/0206411 A9 | * | 11/2003 | Dowling et al. | 362/234 |
| 2003/0214259 A9 | * | 11/2003 | Dowling et al. | 315/312 |
| 2005/0096753 A1 | * | 5/2005 | Arling et al. | 700/11 |
| 2006/0194632 A1 | * | 8/2006 | Hendrickson et al. | 463/42 |
| 2008/0108437 A1 | * | 5/2008 | Kaarela et al. | 463/42 |
| 2009/0282228 A1 | * | 11/2009 | Childs et al. | 713/1 |

* cited by examiner

*Primary Examiner* — Sunit Pandya
(74) *Attorney, Agent, or Firm* — Shook, Hardy & Bacon LLP.

(57) ABSTRACT

Methods and systems for generating a gaming experience, e.g., an immersive gaming experience, in a networked environment are provided. Gaming experiences generated according to the methods provided herein transform a localized, networked environment into a "virtual game space", thereby encouraging group and/or team play. Comprehensive assessments about nearby and/or common household devices, systems (e.g., lighting or sound systems), and/or other networked objects (e.g., clothing, furniture, fabric, etc.) are made and dynamically and intelligently woven into the fabric of the game itself. In this way, any networked device within the environment may be called upon to act as a game controller or input/output device, allowing game challenges to be expanded across a room, a home, and even a neighborhood. Methods for scaling a gaming experience uniquely to each environment, depending on the availability and capabilities of networked devices, are also provided.

8 Claims, 4 Drawing Sheets

COMPUTERIZED METHOD AND SYSTEM FOR GENERATING A GAMING EXPERIENCE IN A NETWORKED ENVIRONMENT

CROSS-REFERENCE TO RELATED APPLICATIONS

Not Applicable.

STATEMENT REGARDING FEDERALLY SPONSORED RESEARCH OR DEVELOPMENT

Not Applicable.

TECHNICAL FIELD

The present invention relates to computing environments. More particularly, embodiments of the present invention relate to computerized methods and systems for generating a gaming experience, e.g., an immersive gaming experience, in a networked environment. Embodiments of the present invention further relate to computerized methods and systems for building a gaming experience, for instance, an immersive gaming experience, for a networked environment. Still further, embodiments of the present invention relate to a tool for building immersive gaming experiences.

BACKGROUND OF THE INVENTION

Electronic games are typically designed and built on the presumption that a user will interact with the game using a very specific game controller, e.g., a joystick. On-line games, for instance, those games that may be played over a network between two or more persons remotely located from one another, typically contemplate use of a mouse or other pointing device. While such games often permit team and/or group play, they do not offer users an immersive gaming experience. That is, the user's environment does not become part of the gaming environment.

Virtual gaming experiences, on the other hand, are becoming more immersive, offering an often times extremely realistic gaming experience wherein the user is made to feel as if his or her physical environment is part of the game, typically by using a specific hardware device such as VR goggles or a display helmet. However, at the same time, virtual gaming experiences are becoming increasingly solitary experiences, providing little in the way of group and/or team play.

Accordingly, an immersive gaming environment that encourages group and/or team play would be desirable. Additionally, a gaming experience which is uniquely scaled to the environment in which it is played and which does not rely on a single, specified game controller, would be advantageous.

BRIEF SUMMARY OF THE INVENTION

Embodiments of the present invention are directed to computerized methods for generating a gaming experience, e.g., an immersive gaming experience, in a networked environment. In one embodiment, the method includes identifying any networked devices in the networked environment, determining the availability of any identified networked devices for incorporation into the gaming experience, and incorporating at least one available networked device into the gaming experience. The method may further include determining an effect the available networked device is to have on the gaming experience upon incorporation, and implementing the determined effect.

Embodiments of the present invention are further directed to a computerized method for building a gaming experience, e.g., an immersive gaming experience, for a networked environment. In one embodiment, the method includes receiving a first data entry identifying a first networked device for incorporation into the gaming experience, receiving a second data entry identifying an effect the first networked device is to have on the gaming experience if such device is present in the networked environment, and publishing the first and second data entries to a gaming community. The method may further include receiving a third data entry identifying a second networked device for incorporation into the gaming experience, receiving a fourth data entry identifying an effect the second networked device is to have on the gaming experience if such device is present in the networked environment, and determining whether the first and second networked devices are related devices. If they are related devices, the method may further include receiving a data entry identifying at least one filter to be applied to the second data entry and the fourth data entry, the filter indicating, for example, a preference order for implementing alternative effects.

Further embodiments of the present invention are directed to a tool for building a gaming experience, e.g., an immersive gaming experience, for a networked environment. In one embodiment, the tool includes one or more game templates and at least one customization option, selection of which permits incorporation of an available networked device into the gaming experience.

BRIEF DESCRIPTION OF THE SEVERAL VIEWS OF THE DRAWINGS

The present invention is described in detail below with reference to the attached drawing figures, wherein.

DETAILED DESCRIPTION OF THE INVENTION

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention provide computerized methods and systems for generating a gaming experience, e.g., an immersive gaming experience, in a networked environment. Gaming experiences generated according to the methods herein described extend beyond a projection screen (or other viewing apparatus) and transform a localized, networked environment into a "virtual game space", thereby encouraging group and/or team play. Comprehensive assessments about nearby and/or common household devices, are made and dynamically and intelligently woven into the fabric of the game itself. In this way, any networked device within the environment may be called upon to act as a game controller or input/output device, allowing game challenges to be expanded across a room, a home, a neighborhood, or across broader geographic locations such as a city, a state, a country, or even across multiple countries, continents, or hemispheres. The methods herein described also scale the gaming experience uniquely to each environment, depending on the availability and capabilities of networked devices.

Embodiments of the present invention further provide computerized methods and systems for building a gaming experience, for instance, an immersive gaming experience, for a networked environment. Game developers may specify that networked devices be utilized as game controllers or input/output devices, considerably expanding the way users interact with their gaming environments. No longer limited to dedicated control consoles, game developers are able to embrace multiple users simultaneously, as individuals or as groups, in radically different and unique ways.

Still further, embodiments of the present invention provide a user-friendly tool for building a gaming experience to be implemented in a networked environment.

Having briefly described an overview of embodiments of the present invention, an exemplary operating environment for the present invention is described below.

Figure 1:
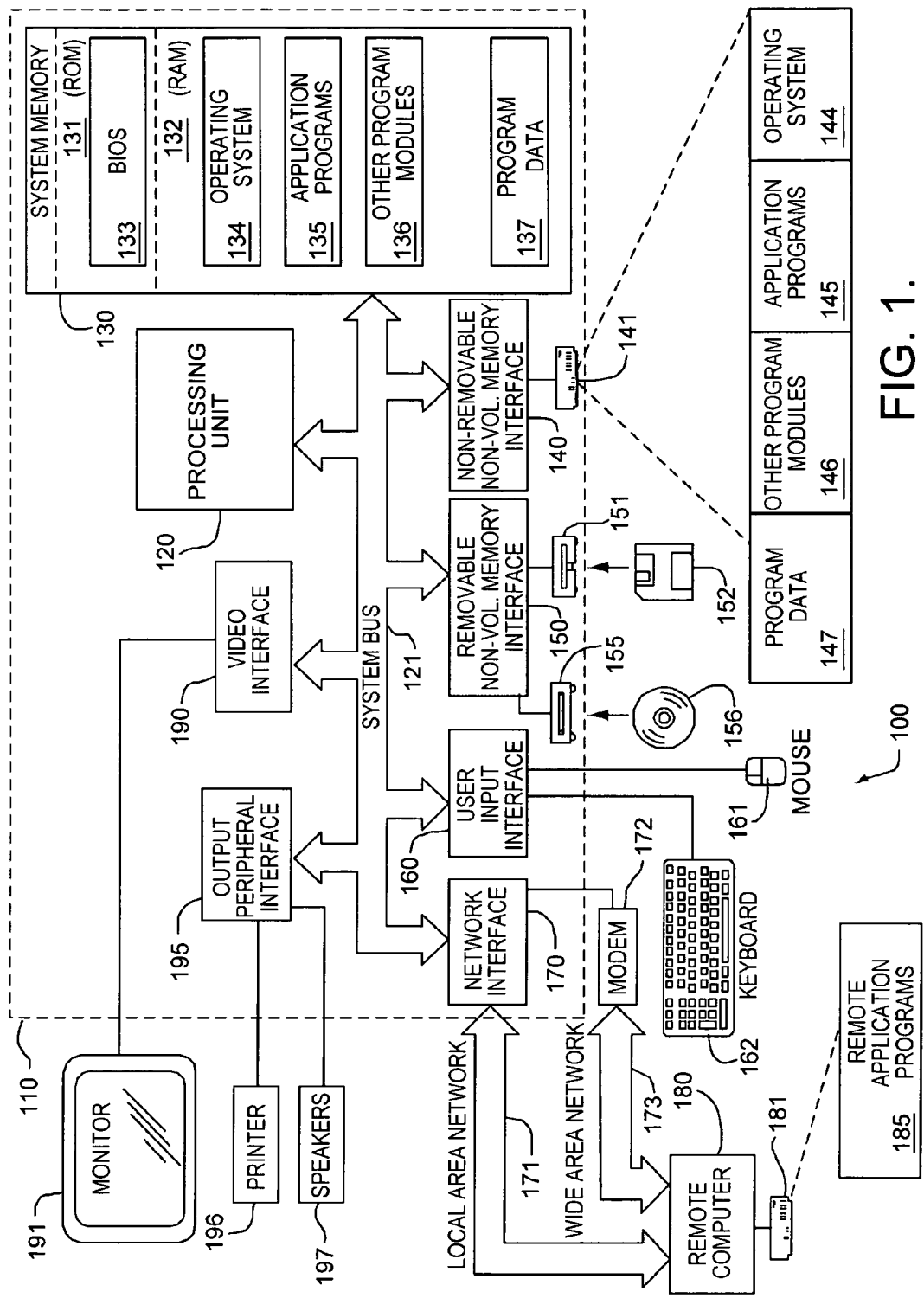
FIG. 1 is a block diagram of an exemplary computing environment suitable for use in implementing the present invention.

Referring to the drawings in general and initially to FIG. 1 in particular, wherein like reference numerals identify like components in the various figures, an exemplary operating environment for implementing the present invention is shown and designated generally as computing system environment 100. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With continued reference to FIG. 1, an exemplary system for implementing the present invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer-readable media. Computer-readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The system memory 130 includes computer storage media in the form of volatile and/or nonvolatile memory such as read only memory (ROM) 131 and random access memory (RAM) 132. A basic input/output system (BIOS) 133, containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks (DVDs), digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer-readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other programs 146 and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor 191, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the network interface 170, or other appropriate mechanism. In a networked environment, program modules depicted relative to the computer 110, or portions thereof, may be stored in a remote memory storage device. By way of example, and not limitation, FIG. 1 illustrates remote application programs 185 as residing on memory device 181. It will be appreciated that the network connections shown are exemplary and other means of establishing a communications link between the computers may be used.

Although many other internal components of the computer 110 are not shown, those of ordinary skill in the art will appreciate that such components and the interconnection are well known. Accordingly, additional details concerning the internal construction of the computer 110 need not be disclosed in connection with the present invention.

When the computer 110 is turned on or reset, the BIOS 133, which is stored in the ROM 131, instructs the processing unit 120 to load the operating system, or necessary portion thereof, from the hard disk drive 141 into the RAM 132. Once the copied portion of the operating system, designated as operating system 144, is loaded in RAM 132, the processing unit 120 executes the operating system code and causes the visual elements associated with the user interface of the operating system 134 to be displayed on the monitor 191. Typically, when an application program 145 is opened by a user, the program code and relevant data are read from the hard disk drive 141 and the necessary portions are copied into RAM 132, the copied portion represented herein by reference numeral 135.

Figure 2:
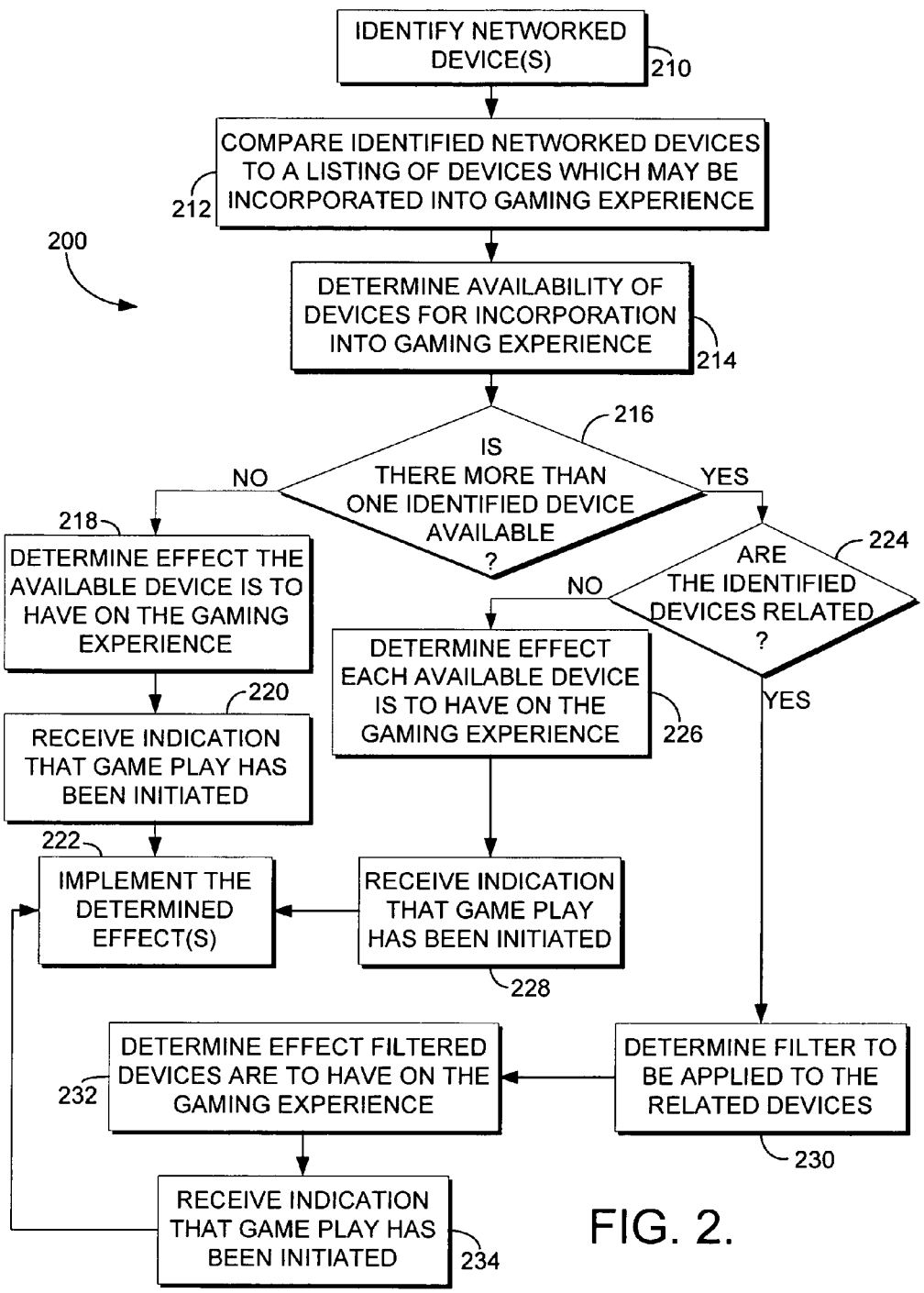
FIG. 2 is a flow diagram showing a method for generating a gaming experience, e.g., an immersive gaming experience, in accordance with an embodiment of the present invention.

As previously mentioned, in one embodiment, the present invention provides a computerized method for generating a gaming experience, e.g., an immersive gaming experience, in a networked environment. Turning to FIG. 2, a flow diagram is illustrated which shows a method 200 for generating a gaming experience in accordance with an embodiment of the present invention. Method 200 contemplates that a user has chosen to initiate play of a particular game in a networked environment. The user may be any member of a gaming community in association with which the desired game is published. A "gaming community", as the term is used herein, refers to a virtual arena capable of hosting numerous gaming challenges simultaneously. A user desiring to join the gaming community, typically would establish a persona in the form of an avatar upon joining. Subsequently, as the user engages in play of one or more games published to the community, as more fully described below, the user's statistics may be captured and stored and may be easily measured or compared to the scores of other users in the community.

Once the user has indicated the game he/she desires to play, the system assesses the networked environment and identifies any networked devices therein. This is indicated at block 210. Networked devices are those devices which include some sort of presence in the network architecture, often identified by a "tag", for instance, a Radio Frequency Identification (RFID) chip, associated therewith and may include, by way of example only and not limitation, a lighting system, a lighting device, an audio system, an audio device, a personal computing device, a tablet computing device, a personal digital assistant, a wired telephone, a cellular telephone, an appliance, an item of furniture, an item of clothing, a garment, fabric, a remote control unit, a pointing device, a game controller, a camera, a television display unit, and a projection display unit. A garment that is recognized by the environment through RFID or the like may also have an effect on the game. By way of example, and not limitation, a networked garment may provide new capabilities to a user, or change the sequence of the game or the type(s) of challenges presented. Similarly, interaction with intelligent fabrics, for example, LEDs, may be designed into the experience as well.

It will be understood and appreciated by those of ordinary skill in the art that tagged networked devices are discussed herein by way of example only and that the methods herein described are capable of leveraging any available identification method. All such variations are contemplated to be within the scope of embodiments of the present invention.

Next, any identified networked devices are compared to a listing of networked devices which may be incorporated into the gaming experience, as indicated at block 212. The listing of networked devices which may be incorporated into the gaming experience are determined by the individual or entity that developed the game the user desires to play and may be based, in whole or in part, on a game template and/or may be customized by the developer. Methods and system for building a gaming experience in a networked environment are more fully described below with reference to FIG. 3.

With continued reference to FIG. 2, once the identified networked devices are compared to a listing of devices which may be incorporated into the gaming experience, the availability of those devices which are both identified and capable of being incorporated into the gaming experience is determined. This is indicated at block 214. A device may be unavailable if, for instance, a power supply is necessary for the device to function and such power supply is not activated. Subsequently, it is determined whether there is more than one networked device available, as indicated at block 216.

If there is not more than one networked device available, it is next determined what effect the available networked device is to have on the gaming experience. This is indicated at block 218. The effect, like the listing of devices which may be incorporated into the gaming experience, is determined by the game developer, as more fully described below with reference to FIG. 3. By way of example only, if the only available networked device is an LED lighting system, the determined effect may be that the lighting system is to display a particular color pattern when play of the game reaches a predefined milestone.

The nature of the available devices and/or the combination of networked devices may alter the course of the gaming experience, the challenges, the rules, or any other aspect of the game. Similarly, in team play, the gaming experience may be altered by the 'ecosystem' of devices available to the team as a whole. One team may do better than another, for example, if they have a larger number of networked devices available—the equivalent of a well-equipped army or arsenal. Further, the position of one or more networked devices within the physical space, or the proximity of networked gaming devices to one another could also have an effect on the gaming experience.

Once the effect the available device is to have on the gaming experience is determined, play of the game may be initiated by a user and an indication of the same may be received by the system. This is indicated at block 220. Subsequently, when play of the game reaches a predefined milestone where implementation of the determined effect is to take place, the effect may be implemented, as indicated at block 222.

With reference back to the step indicated at block 216, if it is determined that, more than one networked device is available, it is next determined whether or not any of the available devices are related to one another. This is indicated at block 224. Related devices are those devices which have effects that the game developer has indicated are to take place in the alternative. For instance, contemplate that the networked environment has both an LED lighting system and one or more halogen or incandescent lights incorporated therein. Further contemplate that the game developer has indicated that if the networked environment has an LED lighting system, the lights are to display a particular color pattern when play of the game reaches a predefined milestone but if there is no LED lighting system and there is one or more halogen or incandescent lights in the networked environment, the lights are to turn off making the environment dark when the game reaches the same predefined milestone. The developer has indicated that the two effects are to take place in the alternative, not simultaneously. As such, the LED lighting system and the halogen or incandescent lights are considered related devices.

If the available devices are not related devices, the effect each available device is to have on the gaming experience is next determined, as indicated at block 226. Unrelated devices are devices which have effects that the game developer has indicated may take place simultaneously. For example, contemplate that the networked environment has both an LED lighting system and a surround sound system incorporated therein. Further contemplate that the game developer has indicated that if the networked environment has an LED lighting system, the lights are to display a particular color pattern when play of the game reaches a predefined milestone and if there is a surround sound system, the system is to output a particular sound pattern when the game reaches the same or a different predefined milestone. There is no indication that the two effects are to take place in the alternative and, thus, they may take place simultaneously. As such, the LED lighting system and the surround sound system are considered unrelated devices.

Once the effect each unrelated device is to have on the gaming experience is determined, play of the game may be initiated by a user and an indication of the same may be received by the system. This is indicated at block 228. Subsequently, when play of the game reaches a predefined milestone where implementation of any of the determined effects is to take place, the effect(s) may be implemented, as indicated at block 222.

With reference back to the step indicated at block 224, if it is determined that the identified devices are related devices, one or more filters to be applied to the related devices is subsequently determined. This is indicated at block 230. A "filter", as the term is used herein, refers to a rule set by the game developer which indicates how to resolve alternative effects with regard to related devices. Thus, recall the example hereinabove described, wherein the game developer has indicated that if the networked environment has an LED lighting system, the lights are to display a particular color pattern when play of the game reaches a predefined milestone but if there is no LED lighting system and there is one or more halogen or incandescent lights in the networked environment, the lights are to turn off making the environment dark when the game reaches the same predefined milestone. The filter in this instance would be a hierarchical filter wherein if both an LED lighting system and one or more halogen or incandescent lights are available in the networked environment, the LED lighting system effect overrides the effect of the lights and the lights are, accordingly, not incorporated into the gaming environment.

Once one or more filters have been determined to resolve alternative effects with respect to related networked devices, the effect(s) that the filtered devices are to have on the gaming experience is determined, as indicated at block 232. For instance, in the above-described example, the effect the filtered devices are to have on the gaming experience is that when the game reaches a predefined milestone, the LED lighting system is to display a particular color pattern. Subsequently, play of the game may be initiated by a user and an indication of the same received by the system. This is indicated at block 234. When play of the game reaches a predefined milestone where implementation of the filtered effect(s) is to take place, the effect(s) may be implemented, as indicated at block 222.

A gaming experience generated according to the method hereinabove described extends beyond a projection screen (or other viewing apparatus) and transforms a localized, networked environment into a "virtual game space", thereby encouraging group and/or team play. Any networked device within the environment may be called upon to act as a game controller or input/output device, allowing game challenges to be expanded across a room, a home, a neighborhood, or even broader geographic locations. The method hereinabove described also scales the gaming experience uniquely to each environment, depending on the availability and capabilities of networked devices.

Figure 3:
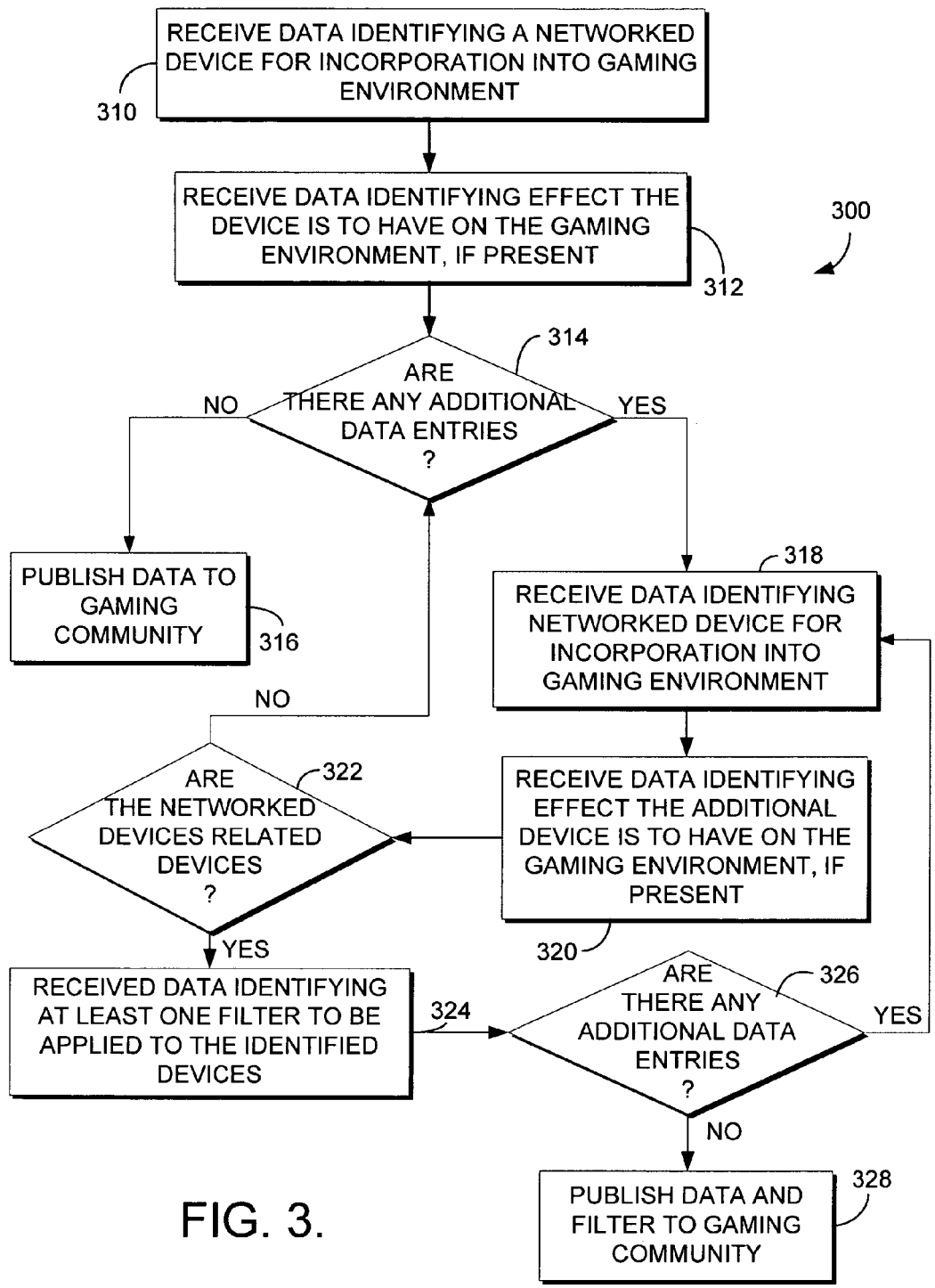
FIG. 3 is a flow diagram showing a method for building a gaming experience, e.g., an immersive gaming experience, in accordance with an embodiment of the present invention.

Turning now to FIG. 3, a method for building a gaming experience, e.g., an immersive gaming experience, for a networked environment is illustrated and designated generally as reference numeral 300. The gaming experience may be built by a game developer utilizing one or more game templates and/or may be entirely customized, as desired. As more fully described below, a gaming experience built in accordance with the methods herein described take advantage of at least one networked device in the user's environment.

Initially, the game developer accesses a game building application and inputs data identifying a networked device which may be incorporated into the gaming environment and an indication of such input is received by the system. This is indicated at block 310. By way of example only, the identified networked device may be a lighting system, a lighting device, an audio system, an audio device, a personal computing device, a tablet computing device, a personal digital assistant, a wired telephone, a cellular telephone, an appliance, an item of furniture, an item of clothing, a garment, fabric, a remote control unit, a pointing device, a game controller, a camera, a television display unit, and a projection display unit.

As will be understood and appreciated by those of ordinary skill in the art, the data entry format may be presented to the game developer, by way of example only, as one or more interaction dialog boxes wherein options may be selected by the game developer or may be input as a series of keystrokes or through a voice or handwriting recognition application. Further, gesture recognition, for example, utilizing biometrics may be utilized. Additionally, input could be recognized by a wide range of sensors as well, for instance, motion sensors, pressure pads, and the like. Formats for data entry are known to those of ordinary skill in the art and the methods herein described are not intended to be limited to any particular format.

Subsequently, the game developer inputs data identifying an effect the identified networked device is to have on the gaming environment, if such device is available in the user's networked gaming environment, and an indication of such input is received by the system. This is indicated at block 312. It is next determined whether any additional data is to be input, as indicated at block 314.

If no additional data is to be input, that is, if the game developer indicates that input has been completed and an indication of such is received by the system, the data is published to the gaming community in association with the developed game. This is indicated at block 316. Once published to the gaming community, the game may be accessed by gaming community members for play and/or modification, if modification rights are provided, as more fully described below.

If, however, additional data is to be input, the game developer inputs data identifying an additional networked device which may be incorporated into the gaming environment and an indication of such input is received by the system. This is indicated at block 318. Again, by way of example only, the additional networked device may be a lighting system, a lighting device, an audio system, an audio device, a personal computing device, a tablet computing device, a personal digital assistant, a wired telephone, a cellular telephone, an appliance, an item of furniture, an item of clothing, a garment, fabric, a remote control unit, a pointing device, a game controller, a camera, a television display unit, and a projection display unit.

Subsequently, the game developer inputs data identifying an effect the additional networked device is to have on the gaming environment, if such device is available in the user's networked gaming environment, and an indication of such input is received by the system. This is indicated at block 320. As more than one networked device has been identified by the user, it is next determined whether the networked devices are related, as indicated at block 322. As previously described, related devices are those devices which have effects that the game developer has indicated are to take place in the alternative. For instance, an LED lighting system and one or more halogen or incandescent lights may be utilized in the alternative to generate a desired lighting effect. If the devices are not related, it is again determined whether any additional data is to be input, as indicated at block 314.

If no additional data entries are to be input, that is, if the game developer indicates that input has been completed and an indication of such is received by the system, the data is published to the gaming community in association with the developed game. This is indicated at block 316. If, however, it is determined that additional data entries are desired, the process returns to the step indicated at block 318.

With reference back to the step indicated at block 322, if it is determined that the devices are related devices, that is, if the game developer has indicated the effects of the devices are to take place in the alternative, the game developer subsequently inputs data identifying at least one filter to be applied to the delineated device effects and an indication of such entry is received by the system. This is indicated at block 324. By way of example only, the game developer may input a filter which indicates that an LED lighting system is to be utilized instead of a halogen or incandescent lighting system if both are available in the user's networked gaming environment.

Once one or more filters has been identified and input, it is determined whether any additional data is to be input, as indicated at block 326. If no additional data is to be input, that is, if the game developer indicates that input has been completed and an indication of such is received by the system, the data entries are published to the gaming community in association with the developed game. This is indicated at block 328. If, however, it is determined that additional data entry is desired, the process returns to the step indicated at block 318.

Embodiments of the present invention contemplate that a game may be collaboratively built by a plurality of remotely located users or may be built by an individual who, upon publishing, provides rights to other members of the community to play the game but not to modify the game. If a game developer wishes to permit collaborative building and/or modification of the game, modification rights may be provided when the game is published to the gaming community.

Figure 4:
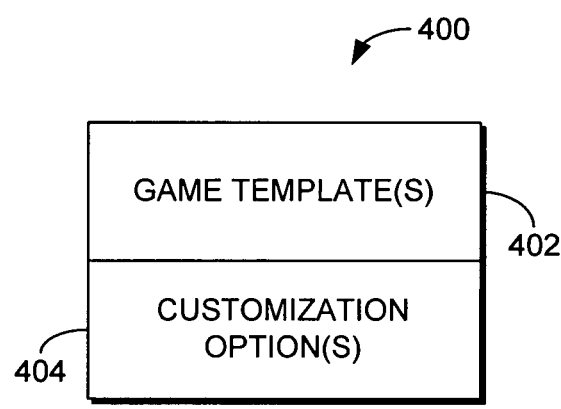
FIG. 4 is a schematic diagram of an exemplary tool for building a gaming experience in accordance with an embodiment of the present invention.

In further embodiments, the present invention relates to a tool, for instance, a game development tool, for building a gaming experience for a networked environment. With reference to FIG. 4, a schematic diagram of an exemplary tool for use in embodiments of the present invention is illustrated and designated generally as reference numeral 400. The tool 400 described herein provides a user-friendly method for game development, wherein the games developed incorporate one or more networked devices in or near a user's gaming environment into the gaming experience. The tool 400 may include one or more game templates 402 providing the game developer with a well-established starting point for building a game, and at least one customization option 404, which permits incorporation of an available networked device into the gaming experience upon selection by the game developer. In one embodiment, the customization option 404 permits the game developer to identify one or more networked devices he/she desires to incorporate into a user's networked gaming experience and an effect the networked device is to have on the gaming experience, if present.

If a plurality of devices are selected or otherwise input by the game developer for incorporation into the gaming experience, the customization option 404 may further permit the developer to indicate whether any of the selected/input devices are related to one another, that is, whether the effects identified in association therewith are to take place in the alternative. If any of the devices are related, the customization option 404 additionally may permit the developer to identify one or more filters to be applied to the devices.

The tool 400 herein described presents user-definable options for interacting with an environment and further provides the ability to publish to a gaming community. The tool 400 imports and supports all industry standard graphics and audio file formats (including three-dimensional formats). Additionally, it provides an intuitive process for setting up recommended linkages to common household digital devices or services. Game developers may target items by rank, for example, connecting to a bank of LED room lights might rank highest in preference. If not available, the next choice might be conventional halogen or incandescent lamps. If no lights are available, the game might attempt to take control of nearby display surfaces and use them as illumination accessories. This intelligent enlistment of devices means the same game can behave differently each time it is played (if devices are added or removed from an environment) and is unique to each space from which it is accessed.

Once uploaded to a gaming community, all player statistics may be captured and stored and can be measured or compared to other users in the community.

Gaming experiences built and generated according to the methods described herein permit the opportunity for immersive game play that's actually a group activity. For instance, one member of a team may be instructed to go out into the community with a networked digital camera to capture photographs of one or more items within a given time frame while other members of the team are to continue game play in another fashion during the same time frame.

As can be understood, embodiments of the present invention provide computerized methods and systems for generating a gaming experience, e.g., an immersive gaming experience, in a networked environment. Embodiments of the present invention further provide computerized methods and systems for building a gaming experience, for instance, an immersive gaming experience, for a networked environment. Still further, embodiments of the present invention provide a user-friendly tool for building a gaming experience to be implemented in a networked environment.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated and within the scope of the claims.

What is claimed is:

1. A computerized method for generating a gaming experience in a networked environment, the method comprising:
   receiving an indication that a user has chosen to initiate play of a game;
   identifying, utilizing a first computing process, any networked devices in the networked environment;
   identifying, utilizing a second computing process, a list of devices from the identified networked devices that are capable of being incorporated into the game, wherein the devices that are capable of being incorporated into the game are devices that are capable of having a specified effect on the gaming experience in response to interaction of the user with the game and in response to interaction of the user with the devices, and wherein the list of devices includes a common household device, a tablet computing device and a game controller;
   determining that the common household device, tablet computing device and the game controller are available for incorporation into the gaming experience;
   identifying, utilizing a third computing process, at least one additional listed networked device that is available for incorporation into the gaming experience, the at least one additional available listed networked device being one or more of a home lighting system, a home lighting device, and a wired telephone;
   determining a first specified effect of the tablet computing device on the gaming experience;
   determining a second specified effect of the game controller on the gaming experience;
   determining a third specified effect on the gaming experience of a relative position of the common household device in a physical space;
   initiating play of the game; and
   generating the gaming experience, the gaming experience including the first specified effect and the second specified effect and the third specified effect, in response to interaction of the user with the game and in response to interaction of the user with the tablet computing device, the game controller, and the common household device, wherein each of the first, second, and third computing processes are performed by one or more computing devices.

2. The method of claim 1, wherein identifying at least one additional listed networked device that is available for incorporation into the gaming experience comprises determining that a plurality of additional listed networked devices is available for incorporation into the gaming experience, and wherein the method further comprises:
   determining if any of the plurality of additional listed available networked devices are related devices; and
   if it is determined that any of the plurality of additional listed available networked devices are related devices, incorporating one or more of the related devices into the gaming experience according to at least one filter.

3. One or more computer storage media having computer-executable instructions embodied thereon for performing a computerized method for building a gaming experience for a networked environment, the method comprising:
   receiving one or more customizable game templates of the gaming experience, at least one of the customizable game templates identifying a first networked device capable of being incorporated into a game, wherein networked devices that are capable of being incorporated into the game are capable of having a specified effect on the networked environment of the gaming experience in response to interaction of a user with the game, in response to interaction of the user with the networked devices, and in response to a relative position of the devices within a physical space;

receiving a first data entry identifying the first networked device as a tablet computing device;

receiving a second data entry identifying a first specified effect of the tablet computing device on the gaming experience in response to interaction of the user with the game; and publishing the first and second data entries to a gaming community.

4. The one or more computer storage media of claim 3, wherein the method further comprises:

receiving a third data entry identifying a game controller as a second networked device capable of being incorporated into the gaming experience;

receiving a fourth data entry identifying a second specified effect of the second networked device on the gaming experience in response to interaction of the user with the game; and publishing the third and fourth data entries to the gaming community.

5. The one or more computer storage media of claim 4, wherein the method further comprises determining whether the first and second networked devices are related devices.

6. The one or more computer storage media of claim 5, wherein if the first and second networked devices are determined to be related devices, the method further comprises:

receiving a data entry identifying at least one filter to be applied to the second data entry and the fourth data entry, wherein the filter indicates a preference for alternately implementing the first specified effect and the second specified effect; and publishing the data entry to the gaming community.

7. The one or more computer storage media of claim 4, wherein the tablet computing device and the game controller are related devices, and wherein the at least one of the customizable game templates permits incorporation of both the tablet computing device and the game controller into the gaming experience.

8. The one or more computer storage media of claim 7, wherein the at least one of the customizable game templates applies at least one filter to the tablet computing device and the game controller.

* * * * *